June 7, 1938.  J. D. FERRY  2,119,910
MECHANISM FOR COATING FOOD FORMS
Filed Oct. 12, 1933
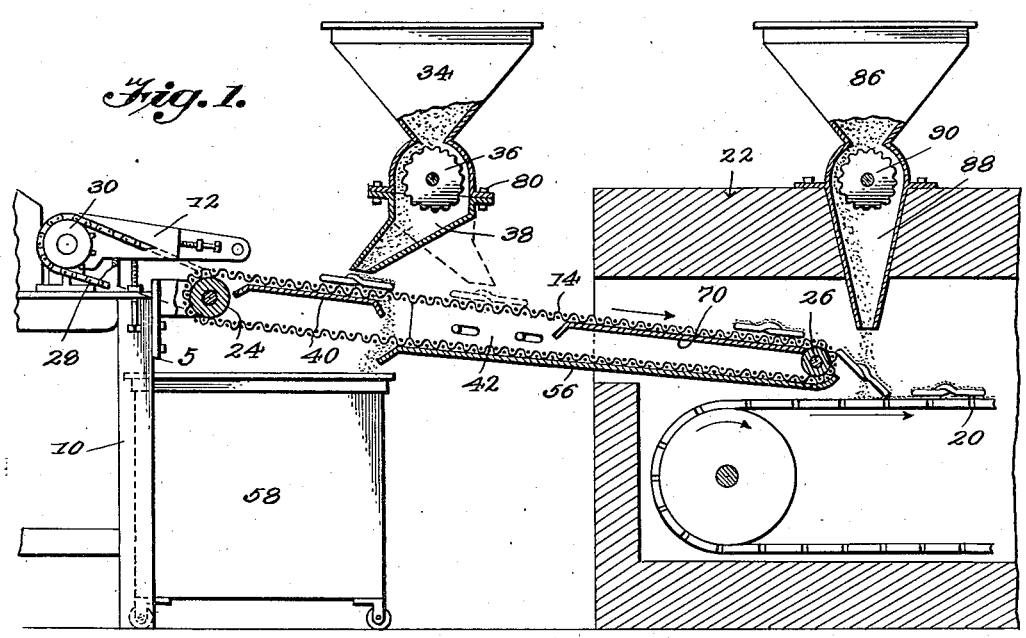
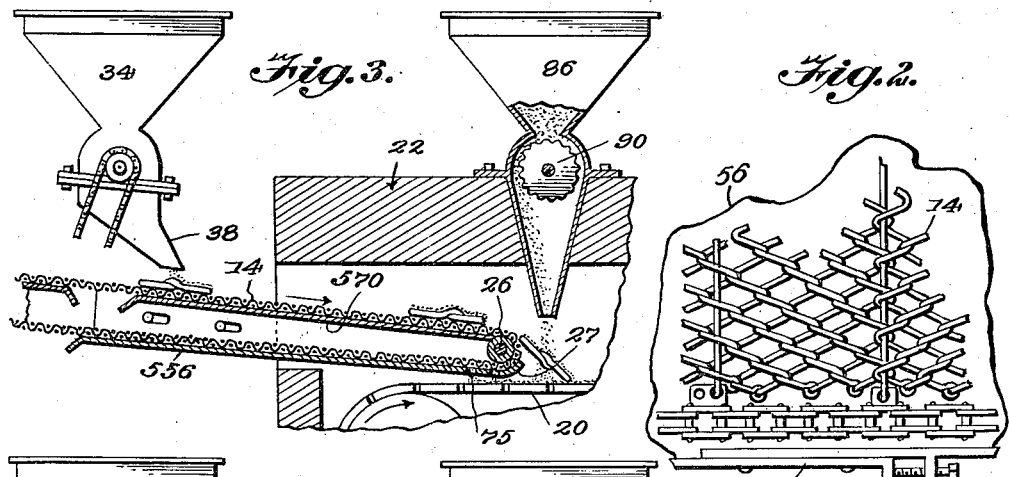
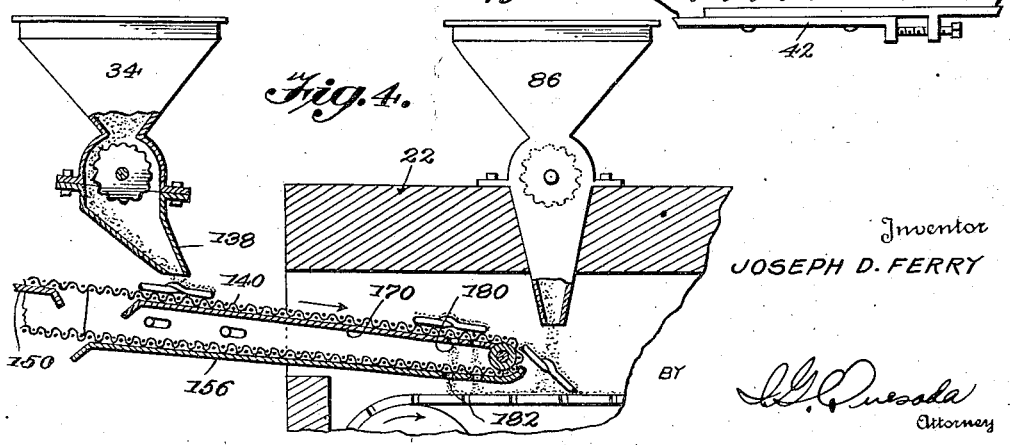
Inventor
JOSEPH D. FERRY
BY
Attorney Patented June 7, 1938

2,119,910

UNITED STATES PATENT OFFICE 2,119,910

MECHANISM FOR COATING FOOD FORMS

Joseph D. Ferry, Harrisburg, Pa.

Application October 12, 1933, Serial No. 693,386

3 Claims. (Cl. 107—43)

This invention relates to a mechanism for coating food forms and the application is a continuation in part of my co-pending application filed July 16, 1932, and serially numbered 622,976.

The baking industry regards it as a rather simple matter to provide for the uniform application of a coating of salt or the like to the top surfaces of pretzel or other food forms. However, it is much more desirable and at the same time much less simple to apply a coating of salt or the like to the food forms on both the upper and lower surfaces thereof, the desirability of such coating of the upper and lower surfaces of the food forms residing in the fact that the food forms such as pretzels, are rendered more salable in competition with those coated only on the upper surface. In addition, by coating the lower surfaces of the pretzels or the like, such food forms are thereby spaced slightly above the moving hearth of the baking oven to form intervening air spaces protecting the pretzels against scorching, a consideration of the first magnitude.

With an appreciation of the foregoing, the invention forming the subject of this application will be found to provide a simple and reliable mechanism by which the pretzel forms are coated or speckled on both the upper and lower surfaces thereof to achieve the above advantages, to wit: first, to render the pretzels more salable and second, to space the pretzel forms slightly above the movable hearth to which they are fed so as to provide intervening air spaces protecting the pretzel forms or the like against scorching.

Another aim of the invention is to provide a coating mechanism which may be employed in connection with movable hearth baking ovens of conventional design without elaborate alteration of such ovens.

Other objects and advantages will be apparent during the course of the following description.

In the accompanying drawing forming a part of this application and in which like numerals are employed to designate like parts throughout the same, Figure 1 is a vertical sectional view through a coating mechanism embodying the invention, Figure 2 is a fragmentary plan view of a conveyor embodied in the invention, Figure 3 is a fragmentary vertical sectional view through another expression of the invention, Figure 4 is a detail longitudinal sectional view through a further modification of the invention.

In the drawing, the numeral 10 designates a portion of a pretzel cooking machine, the outlet end portion of the machine being disclosed along with the discharge end portion of a conveyor 12. It is clearly shown in Figure 1 that the discharge end of the conveyor 12 is located in superposed feeding relation to the receiving portion of the conveyor 14 of the coating or salting mechanism featured in this application so as to furnish food forms thereto.

At this point, it might be explained that the salting mechanism is shown to be located between the pretzel cooking machine 10 and the movable hearth 20 of a baking oven 22. Thus, it is clear that the conveyor 14 of the salting mechanism serves as a simple means to conduct or transfer the pretzel forms or the like from the cooking apparatus 10 to the baking oven, it being observed in this connection and known to those skilled in this art, that the mechanism 10 provides for the pre-cooking of the pretzels for the baking process which takes place in the oven 22.

It is shown in Figure 1 that the conveyor 14 is endless and is trained about a supporting roller 24 and a fixed supporting bar 26, the roller 24 being carried by brackets 5 and having connection in any suitable manner for example, through an endless chain 28, with a driving means which may, for the purpose of illustration, be in the nature of a sprocket wheel 30, mounted on the machine 10. Clearly, any means may be employed to drive the conveyor 14 with the upper flight moving in the direction of the oven.

A feeding unit in the nature of a hopper 34 is shown to be located a slight distance above the conveyor 14 and is, of course, open at the top thereof for the reception of a supply of salt or other granular material. The discharge of the material from the hopper is regulated through the controlled rotation of a feeding roller 36 longitudinally grooved or fluted although this forms no special part of the invention.

The outlet member 38 of the hopper is shown to be disposed at an acute angle to a vertical line passing through the hopper and is decreased in cross-sectional area toward the open lower end thereof to define a nozzle or jet by which the salt is discharged onto the pretzel forms as they pass below on the conveyor 14.

The outlet member 38 extends entirely across the conveyor body 14 to furnish a uniform coating of salt to all the pretzels passing on the conveyor 14.

Now, attention is invited to Figure 2, in which it is illustrated that the conveyor 14 is in the nature of a reticulated body made up of a plurality of transversely extending helical wires having interlocking convolutions defining a longitudinally and transversely flexible woven wire supporting belt for the pretzel forms or the like.

It is clear from Figure 2 that while the body 14 is open or is reticulated for the free passage therethrough of salt in a manner to be explained, the convolutions of the various transversely extending and interlocking wires are sufficiently close together to support the pretzels or the like flatly in place on the upper flight of the conveyor. That is to say, the pretzel forms or the like will occupy the positions suggested in Figure 1, and will not assume inclined positions with portions of the pretzel forms or the like lodged between the convolutions of the conveyor. In other words, the mesh of the material forming the conveyor is fine enough to avoid this.

From a study of Figures 1 and 2 and the immediately preceding description of the nature of the conveyor 14, it will be seen that a portion of the salt or other granular material from the outlet member 38 will pass freely through and around the pretzel forms and through the reticulated conveyor belt below and will contact a deflector 40 in the form of a plate extending entirely across the conveyor body and joined at the ends thereof to suitable side arms 42 of the conveyor frame.

As illustrated in Figure 1, the outlet member 38 is disposed at an acute angle to the top surface of the deflector 40 with the result that the salt or other granular material upon contacting the deflector or rebound member is directed upward in flight for engagement with and adhesion to the under surfaces of the pretzel forms or the like. That is to say, the top surface of the deflector or rebound member 40 and the angle of this surface with respect to the line of descent of the salt constitutes a means by which the salt striking such top surface is deflected in flight up through the substantially larger reticulations of the conveyor and into contact with the under surfaces of the pretzels.

In further adverting to this important feature of the invention, it will be seen that the salt or the like is discharged in flight from the hopper at an acute angle to the perpendicular or to the vertical axis of the hopper and during the descent of such granular material in flight the top surfaces of the pretzel forms or the like are coated.

That part of the granular material which passes through the food forms or about the sides of the food forms continues downward in flight through the reticulations of the conveyor 14 and upon striking the member 40 is bounced upward in flight at an acute angle to the surface of the deflector, through the conveyor body 14, and into contact with the under surfaces of the pretzel forms or the like where it adheres.

In practice, it has been found that although the reticulated conveyor 14 operates between the hopper 34 and the deflector and in the path of movement of the granular material, there is sufficient movement of the rather minute grains of salt or the like in flight through the substantially larger openings in the conveyor to give to the under surfaces of the pretzel forms or the like the desired coating of salt.

With the pretzel forms or the like thus coated on the under surfaces thereof and before the same are fed to the movable hearth 20, the salability of the pretzels is increased, the taste is improved, and the salt applied to the under surfaces of the pretzel forms acts to space the pretzel forms from the heated supporting plate of the hearth so that scorching of the pretzel forms is avoided, this latter function being important.

The coating mechanism shown in Figure 1 also provides for the application of salt to the sides of the pretzels, as is apparent.

The surplus salt which passes through the upper flight of the conveyor is dropped down through the lower flight of the conveyor and is dragged back along the return plate 56 into the collector 58. In this manner, surplus salt is prevented from entering the oven hearth and frequent cleaning of the oven as a result of excess accumulations of loose salt therein is rendered unnecessary. The edge portions of the return plate 56 are welded or otherwise secured to the side arms 42 of the conveyor frame.

It is shown in Figure 1, that a second plate 70 is located between the deflector 40 and the bar 26 and immediately below the upper flight of the conveyor so as to cooperate with the plate 40 in forming a generous supporting and guiding means for the upper flight, holding the same against sagging. The plate 70 is joined rigidly at its longitudinal edges to the side arms 42 and has what might be said to be the inner end thereof spaced a sufficient distance from the deflector 40 to define an intervening transversely extending opening for the descent of salt.

The conveyor including the side arms 42, the reticulated belt 14 and the plates 40, 56, and 70 may be straight as shown, or curved longitudinally to adapt the conveyor to the particular conditions encountered. For example, it may be desired to place the salting mechanism at a level lower than that of the entrance opening of the oven in which case, the conveyor of the salting mechanism is curved upward to extend the nose of the conveyor into the oven.

The angularly disposed outlet member or nozzle 38 of the hopper is shown to be detachably secured to the body of the hopper through the medium of fastening bolts 80 or the like, with the result that such outlet member may be reversed or changed from the full line position shown in Figure 1 to the dotted line position shown in that same figure.

It will be seen that when the outlet member 38 is arranged in the dotted line position shown in Figure 1, only the top and sides of the pretzels will be coated with salt at this point, while the salt which is not taken by the pretzels is allowed to pass through the upper flight of the conveyor to be dragged back into the collector 58 by the lower flight of the conveyor, it being observed in this connection that the plate 56 serves as a support for the returning salt.

In other words, when the outlet member 38 is arranged in the dotted line position shown in Figure 1, the salt which is not immediately taken by the pretzels descends through both flights of the conveyor and is received in the container 58.

Figure 1 illustrates that a second hopper 86 may be employed and is shown to be provided with an outlet nozzle or portion 88 diminished in cross-sectional area toward the lower end thereof and having an outlet mouth immediately beyond the discharge end of the conveyor 14 so as to direct salt or the like through the pretzel forms onto the conveyor below, this being done at the moment of transfer of the pretzel forms from the conveyor 14 to the moving hearth 20.

More specifically, the salt is directed through the pretzel forms while the pretzel forms occupy the inclined positions suggested in Figure 1.

This allows the moving hearth 20 to receive sufficient salt to support the pretzels in spaced relation to the hearth as shown in Figure 1.

In other words, the outlet member 88 is located immediately beyond the discharge end of the conveyor with the mouth of the member 88 at approximately the horizontal level of the conveyor and positioned to drop salt onto the pretzels and through the pretzels at the very moment of transfer of the pretzels from the conveyor 14 to the moving hearth whereby sufficient salt is furnished to the plates 20 to form rests for the pretzels, holding the pretzels slightly above the plates with intervening air spaces protecting the pretzels against scorching. In addition, the grains of salt which drop through the pretzels will adhere to the under surfaces of the pretzels when the pretzels drop thereon so that the pretzels upon leaving the oven will be found to be coated on the upper and lower surfaces thereof.

Also, by furnishing a coating of salt to the pretzels when occupying the inclined positions shown in Figure 1, the side walls of the pretzels or substantial portions thereof, are coated with salt.

The discharge of salt from the hopper may be regulated with the aid of a rotary longitudinally ribbed feeding roller 90. It is clear to those skilled in the art that the roller 90 and the roller 36 may be driven by any suitable source of power, not shown.

In the form of invention shown in Figure 3, the plate 570 acts as combined deflector and conveyor support, extending beneath the top flight and the outlet 38 to deflect salt therefrom into contact with the under surfaces of the pretzels. Salt not taken by the pretzels at this stage is conducted along the plate 570 in the direction of the oven.

It will be seen that the discharge end of the plate 570 directly abuts the supporting bar 26 causing the salt to travel over the bar to be picked up by the upwardly curved lip of the lower plate 556.

More specifically, that end of the plate 556 located at the discharge end of the salting mechanism is curved upward about the discharge end of the conveyor to form a lip for the collection of the advancing salt from the upper flight of the conveyor. The salt thus collected by the upwardly curved lip is dragged along by the lower flight of the conveyor across several series of spaced, transversely extending rows of downwardly directed apertures 75, with the result that a predetermined quantity of salt, depending on the size of the openings and the speed of the conveyor, is allowed to drop onto the movable hearth located immediately below. It is important to observe that the openings 75 furnish a coating of salt to the hearth 20 at a point rearwardly of or removed from the pretzel feeding station so that when the pretzels are discharged from the conveyor the same are laid upon a previously salted portion of the oven hearth. By this arrangement, a portion of the salt which is furnished to the oven hearth will adhere permanently to the under surfaces of the pretzels and at the same time such salt as is furnished to the oven hearth acts to support the pretzels in spaced relation to the oven hearth to protect the pretzels against scorching.

A portion of the salt collected by the lip 27 may not pass through the openings 75 and this is dragged along the plate 556 by the lower flight of the conveyor and is dropped into the collector 58.

Thus, there is avoided a congestion of salt or other coating at the discharge end of the conveyor.

In the form of invention illustrated in Figure 4, the endless woven wire belt 140 corresponds to the woven wire belt 14 and has the upper flight thereof movable along plates 150 and 170, while the lower flight of the conveyor is movable along the plate 156.

In this form of invention, the outlet member 138 of the feed hopper is directed toward the line of travel of the pretzels and has the mouth thereof positioned above the plate 170 so that the plate 170 acts to support the upper flight and as a deflector for salt. The salt which does not adhere to the pretzels is dragged along the plate 170 by the advancing upper flight.

Adjacent the pretzel discharge end of the conveyor 140 and slightly rearward thereof, the upper and lower plates 170 and 156 respectively are provided with substantially aligned openings 180 and 182 respectively. It is believed to be clear that the salt which the upper flight of the conveyor drags along the top plate 170 is dropped through the openings 180 and 182 onto the movable oven hearth below. The salt passages or openings 180 and 182 are located rearward or behind the pretzel feeding station so as to furnish a coating of salt to the oven hearth at a point removed from or rearward of the pretzel feeding station. By this arrangement also, the pretzels or other food forms are furnished on the under sides thereof with a lasting coating of salt and the pretzels are supported in slightly spaced relation to the oven hearth to avoid scorching. If, for any reason, all the salt dragged along the upper plate 170 is not dropped through the openings 180, the upwardly curved lip at the lower end of the plate 156 will function as a collector and the salt thus collected by the lip will be dragged by the lower flight of the conveyor into position for passage through the openings 182. In this manner there is assured a constant and uniform supply of salt to the oven hearth.

Having thus described the invention what is claimed is:

1. In a salting mechanism for pretzel forms, a reticulated conveyor having upper and lower flights, a salt hopper above the conveyor and having an outlet member provided with an outlet end to discharge salt onto pretzel forms carried by the upper flight of the conveyor, a plate below the hopper and the upper flight of the conveyor, a second plate in guiding relation to the lower flight of the conveyor and having an upwardly curved lip embracing the discharge end of said conveyor and disposed in receptive relation to the salt discharged from said first-named plate, said second-named plate being formed with a plurality of salt passages.

2. In a salting mechanism for pretzel forms, a reticulated conveyor having upper and lower flights, a salt hopper above the conveyor and having an outlet member provided with an outlet end to discharge salt onto pretzel forms carried by the upper flight of the conveyor, a plate below the hopper and the upper flight of the conveyor and being in supporting relation to the upper flight, a second plate in guiding relation to the lower flight of the conveyor and having an upwardly curved lip embracing the discharge end of said conveyor and disposed in receptive relation to the salt discharged from said upper plate, a conveyor immediately below and overlapped by said second plate, said lower plate being formed with means to furnish a coating of salt to said second named conveyor.

3. In combination, an oven having a traveling baking hearth, a feeder for feeding food products to said hearth, said feeder comprising a continuous foraminous conveyor having its discharge portion disposed above and in overlapping relation to said hearth, sifting means for depositing granular coating material on the food products carried by the upper run of said foraminous conveyor, a plate in supporting engagement with the return run of said conveyor and completely underlying the discharge portion of the conveyor for intercepting and receiving the surplus coating material, said plate having an upwardly curved lip embracing the discharge end of the conveyor and also having means associated therewith for depositing coating material on the baking hearth whereby the food products are supported by the coating material during the baking process.

JOSEPH D. FERRY.